June 24, 1941.  J. WEGNER ET AL  2,247,215
CUTTING APPARATUS
Filed July 25, 1940  4 Sheets-Sheet 2
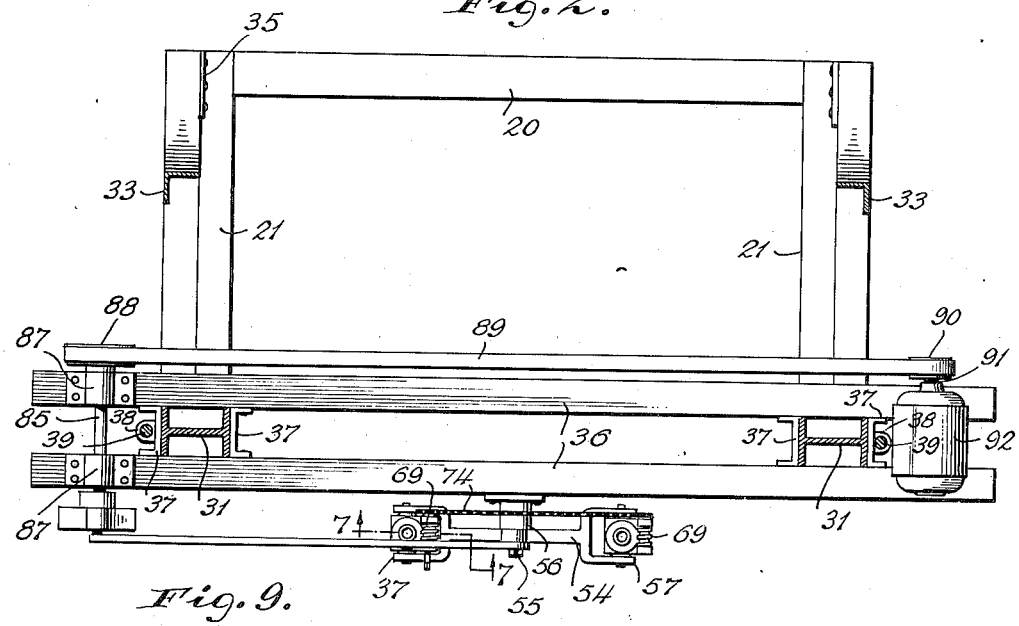
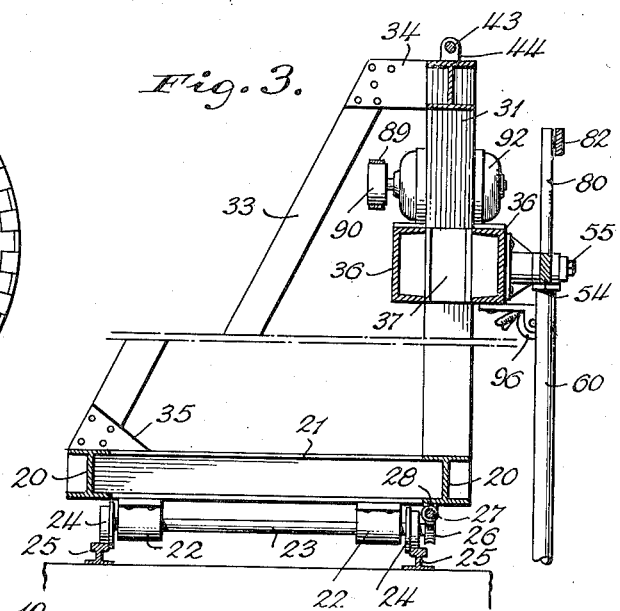
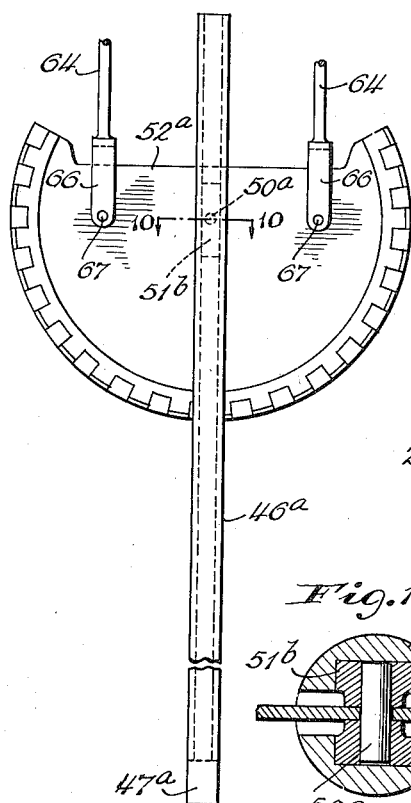
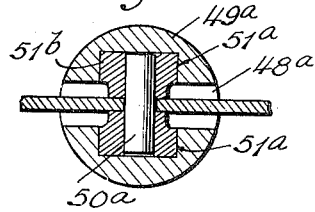
INVENTORS
JULIUS WEGNER
ALFRED WEGNER
BY
*John A. Kehlenbeck*
ATTORNEY

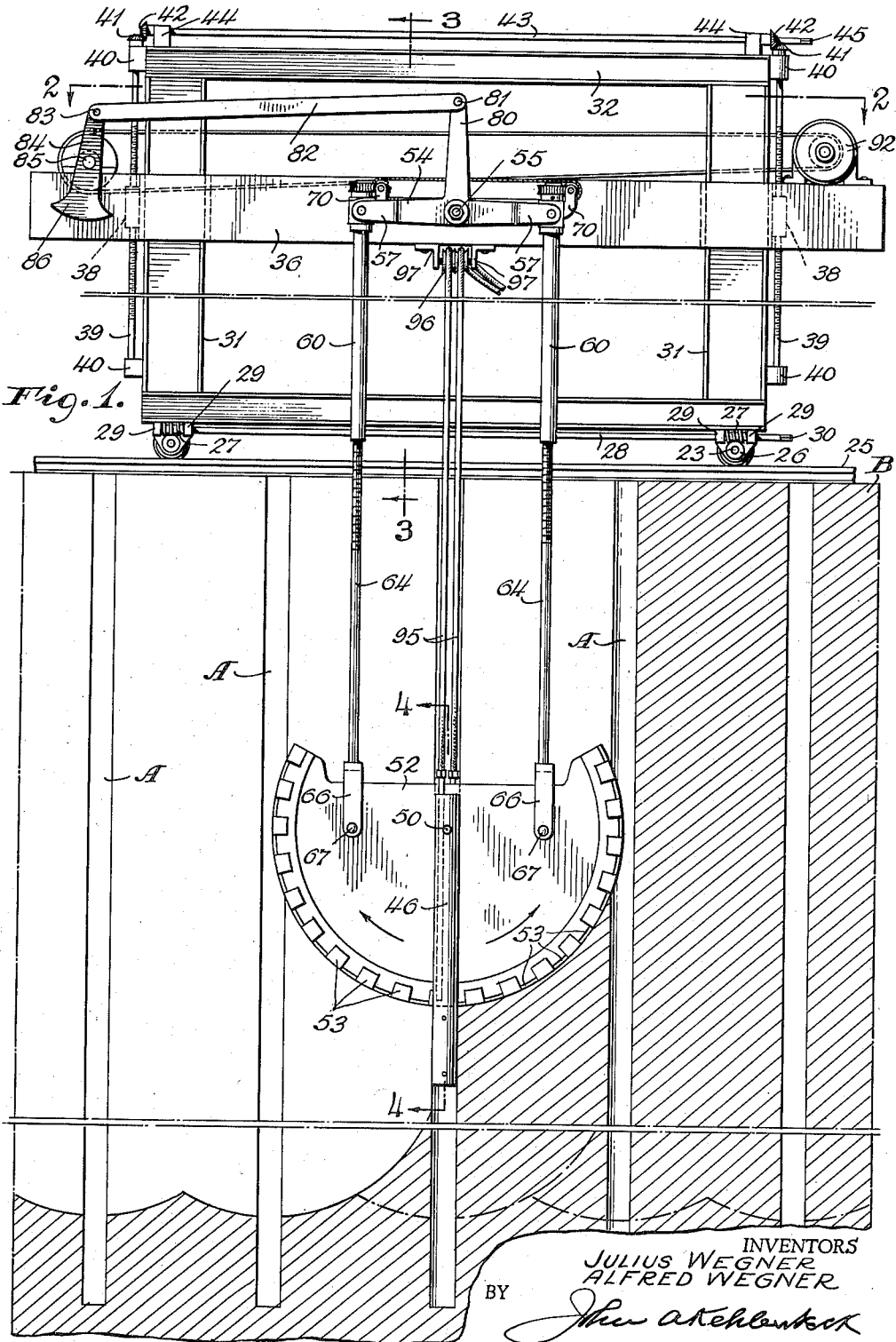

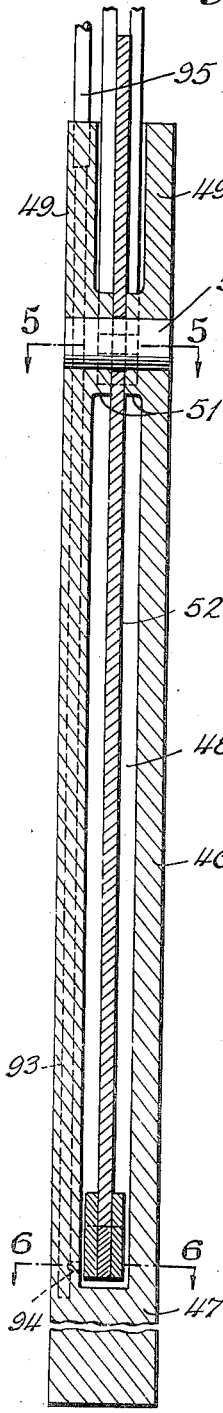
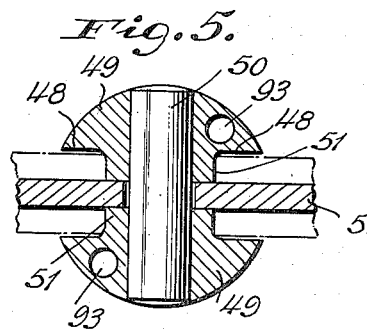
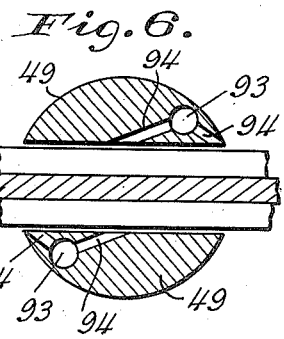
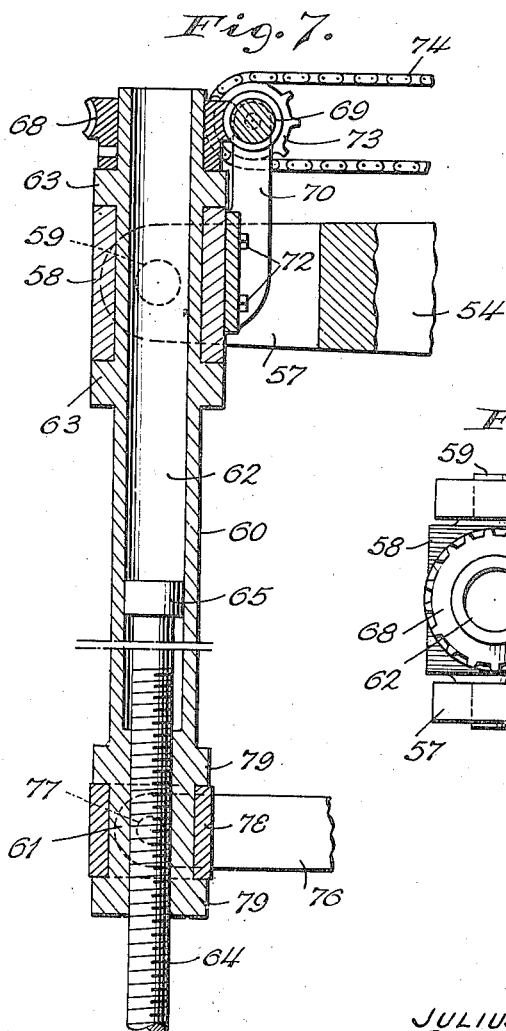
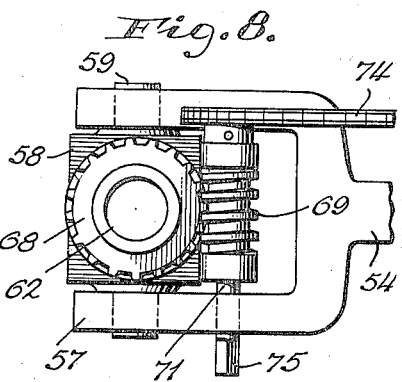

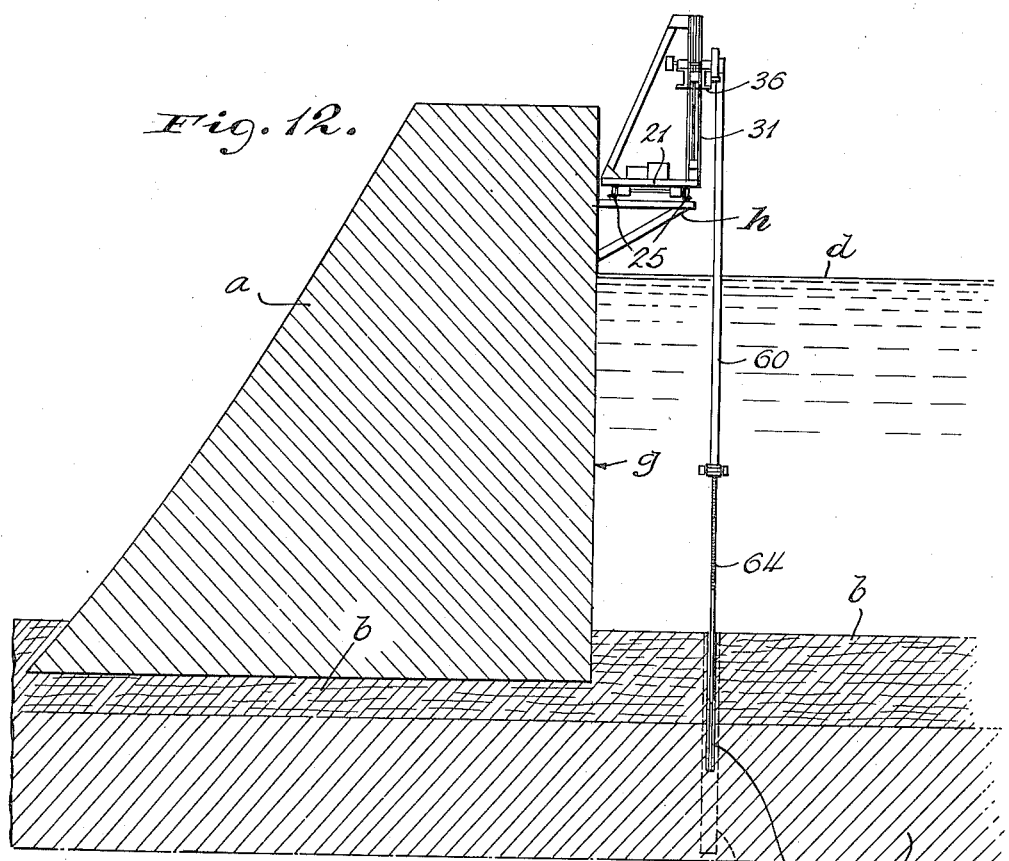
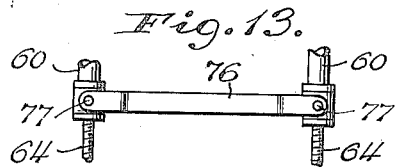
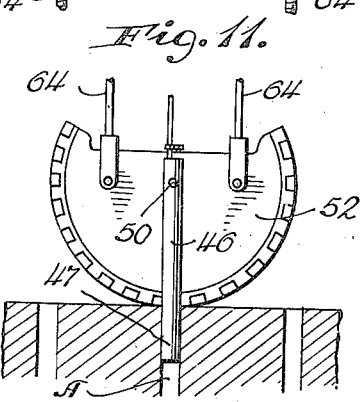
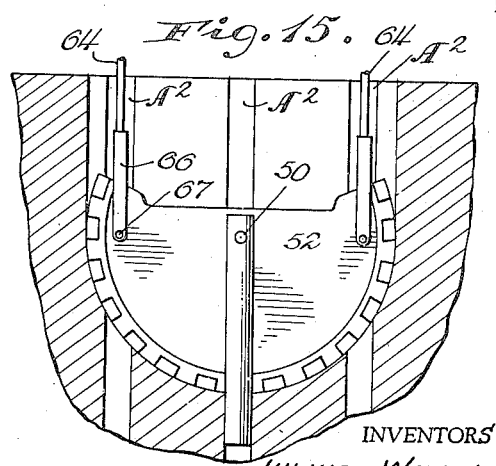

Patented June 24, 1941

2,247,215

UNITED STATES PATENT OFFICE 2,247,215

CUTTING APPARATUS

Julius Wegner and Alfred Wegner, Flushing, N. Y.

Application July 25, 1940, Serial No. 347,366

11 Claims. (Cl. 262—32)

The invention relates to cutting apparatus and more particularly to apparatus for cutting stone and other materials, and has for its object to provide a novel and simple apparatus which is capable of producing clean cuts with a minimum of waste and whereby the cutting direction is maintained in an efficient manner regardless of any variations in the hardness of the stone or other material being cut. The invention contemplates further the provision of a cutting apparatus whereby the cutting operations may be efficiently carried out under conditions in which the stone or other material is difficult of access as exemplified for instance by the bedrock of a stream or other body of water. Other more specific objects will appear from the description hereinafter and the features of novelty will be pointed out in the claims.

In the accompanying drawings, which illustrate examples of the invention without defining its limits, Fig. 1 is a side elevation of the novel apparatus shown in the operation of cutting stone, for instance, in a quarry; Fig. 2 is a horizontal section on the line 2—2 of Fig. 1; Fig. 3 is a vertical cross-section on the line 3—3 of Fig. 1; Fig. 4 is an enlarged fragmenttary section on the line 4—4 of Fig. 1; Fig. 5 is an enlarged section on the line 5—5 of Fig. 4; Fig. 6 is a similar view on the line 6—6 of Fig. 4; Fig. 7 is an enlarged detail section on the line 7—7 of Fig. 2; Fig. 8 is a plan view of the mechanism shown in Fig. 7; Fig. 9 is a fragmentary elevation of another form of the invention; Fig. 10 is an enlarged horizontal section on the line 10—10 of Fig. 9; Fig. 11 is a fragmentary view showing the cutting implement in position at the start of a cutting operation; Fig. 12 is a diagrammatic view illustrating another use of the apparatus; Fig. 13 is a detail view showing a connection which may be embodied in the apparatus; Fig. 14 is an edge view of articulated plates designed to fit into the cuts made by the apparatus of Fig. 12; and Fig. 15 is a fragmentary diagrammatic view illustrating another arrangement of the apparatus.

In the form shown in Figs. 1, 2, and 3, the novel apparatus comprises a novel support consisting for instance of I-beams 20 located in spaced parallel relation, and spaced parallel I-bams 21 united with said beams 20 in any suitable manner in transverse relation thereto to form a rectangular horizontal base as shown in Fig. 2. To enable the apparatus as a whole to be shifted to different positions for the purpose of effecting successive cuts, the aforesaid horizontal platform is provided with depending bearings 22 in which shafts 23 are journalled. The shafts 23 carry flanged wheels or rollers 24 arranged to travel on guide tracks or rails 25 which are suitably laid in relation to the work being performed to define a fixed path for the cutting apparatus. The shafts 23 may be operated in unison to correspondingly rotate the wheels 24 in any convenient manner when it is desired to shift the cutting apparatus to a new cutting position. For instance, as shown in the illustrated example, the shafts 23 may be provided with worm pinions 26 arranged in mesh with worm gears 27 fixed upon an operating shaft 28 rotatably mounted in bearings 29 depending, for instance, from the front beam 20, as shown in Figs. 1 and 3; to facilitate the operation of the shaft 28 one end thereof may be squared as indicated at 30 or otherwise formed for the accommodation of a conventional crank or other suitable actuating medium.

An upright guide frame is carried by the aforesaid horizontal platform and comprises vertical guide members 31 preferably in the form of I-beams fixed upon the front beam 20 in any convenient way and extending in perpendicular relation thereto as illustrated in Figs. 1 and 3. A horizontal beam 32 extends between and is suitably secured to the upper ends of the vertical members 31 to fix the same in spaced parallel relation with each other. For the purpose of stabilizing the vertical guide members 31, the apparatus may include inclined braces 33 each having one end conveniently secured to a lug 34 located at the upper end of a guide member 31 and its other end suitably fastened at 35 to the I-beams 21. The apparatus further includes adjustable carrying means for the cutting means and the mechanism for operating the same, and adjusting means for adjusting said carrying means to progressively advance the cutting means as the cutting operation proceeds and to restore said cutting means to an initial starting position for effecting successive cuts. In the illustrated example the carrying means comprises channel beams or members 36 extending between and preferably beyond the vertical guide members or I-beams 31 in surface engagement with opposite edges of the flanges thereof as illustrated in Fig. 2. The channel beams or members 36 are carried by slides 37 which may be of channel form in cross-section and in any case are located in associated pairs in surface engagement with the faces of the flanges of said guide members or I-beams 31, as shown in Fig. 2.

In the illustrated example the means for adjusting the channel beams or members 36 lengthwise of the vertical guide members 31 to correspondingly adjust the cutting means comprises internally screwthreaded nuts 38 fixed upon one of the slides 37 of each pair thereof in screwthreaded engagement with upright adjusting screws 39. The latter are rotatably mounted against axial displacement in bearings 40 carried by the vertical guide members 31 and at their upper ends are provided with bevel gears 41 in mesh with associated bevel gears 42 secured upon an operating shaft 43. This shaft 43 is rotatably mounted in bearings 44 on the horizontal beam 32 and is operated in any convenient manner, and for this purpose may have its free end squared as shown at 45 or otherwise shaped for the accommodation of a conventional crank or other suitable operating tool.

The cutting means of the illustrated apparatus comprises an elongated carrying and guiding member 46 having a solid lower end 47 of cylindrical form and a transverse slot 48 extending diametrically across the member 46 from the solid lower end 47 to the upper end thereof as shown in Fig. 4; with this arrangement two upright solid sections 49 of segmental form in cross-section project upwardly from the solid lower end 47 to constitute what may be termed the split cylindrical carrying and guiding member 46. Near their upper ends the segmental sections 49 are connected by means of a pivot pin 50 which passes through and bridges the space between two opposed lugs 51 projecting toward each other and preferably comprising integral parts of the sections 49. The cutting means further includes a cutting element or blade 52 having a circular cutting periphery provided with cutting teeth 53 of any conventional type suitable for cutting stone or other materials and fixed in place on the blade in any convenient manner. The blade 52 is pivotally mounted on the pivot pin 50 between the lugs 51 and projects outwardly through the slot 48 in opposite directions and downwardly in said slot as shown in Figs. 1 and 4, the arrangement being such that the cutting periphery is curved about the axis of the pivot pin 50 as a cutter or, in other words, is concentric to said pin 50.

In the operation of the apparatus, the cutting blade 52 is rocked or oscillated on the pivot pin 50 with the teeth 53 in cutting engagement with the stone or other material to be cut, the oscillating movement imparted to the cutting blade 52 being of any desired type and consisting of either a continuous rocking movement, a dwelling movement, a vibratory movement, or the like. In the illustrated example, simple oscillating movements following substantially an arc are imparted to the blade 52 by the operating means shown in the drawings. This means comprises a rocking lever 54 pivotally mounted at 55 on a bearing 56 projecting outwardly from the outer face of the forward beam 36 as shown in Figs. 1 and 2. The opposite ends of the lever 54 are formed with forks 57 in which bearing blocks 58 are mounted to rock on trunnions 59 for the accommodation of cylindrical sleeves or members 60 having internally screwthreaded ends 61 and cylindrical internal chambers 62 extending from said ends 61 to the opposite ends of said sleeves or members 60. The sleeves or members 60 are rotatably mounted in the bearing blocks 58 and are provided with annular flanges 63 in engagement with opposite faces of said bearing blocks 58 to maintain said sleeves or members 60 against axial movements relatively to the forks 57 of the lever 54 without interfering with the rotation of the members or sleeves 60 in the bearing blocks 58. Screwthreaded rods 64 are in screw-threaded engagement with the ends 61 of said sleeves or members 60 and project into the chambers 62 thereof; the upper ends of the rods 64 are provided with heads 65 which slidably fit the chambers 62 of said sleeves or members 60, and the lower ends of said rod 64 terminate in forked members 66 which fit over the upper edge of the blade 52 and are pivotally connected therewith at 67. To enable the sleeves or members 60 to be rotated in the bearing blocks 58 relatively to the rods 64, said members or sleeves 60 are provided at their upper ends with worm gears 68 meshing with worm pinions 69 journalled in bearing brackets 70 by means of a shaft 71, said brackets being secured to the bearing blocks 58 by screws 72 or otherwise, and projecting upwardly therefrom, as shown in Figs. 1 and 7. The shafts 71 of each worm pinion 69 carries sprocket wheels 73 operatively connected with each other by means of a sprocket chain 74. To facilitate the concurrent rotation of the sleeves or members 60 in the bearing blocks 58, one or both of the worm pinion shafts 71 may be formed with squared or otherwise shaped ends 75 for the accommodation of a conventional crank or other operating means. In some installations the members or sleeves 60 may be of considerable length, in which case it may be desirable to include means for preventing undue vibration of said sleeves or members 60. As shown in Figs. 7 and 13, this means may comprise a stabilizing member 76 having its opposite ends pivotally connected at 77 with bearing sleeves 78 which surround the sleeves or members 60 at their lower ends between annular flanges 79 with which said sleeves or members 60 are in such case provided.

An arm 80 extends upwardly from the lever 54 preferably as an integral part thereof and is pivotally connected at 81 with one end of a link 82 the other end of which is pivotally connected at 83 with an operating crank 84 suitably secured upon an operating shaft 85 and preferably carrying a counter-weight 86 to stabilize the operative movements of said crank 84. The shaft 85 is mounted in bearings 87 carried by the beams 36 on the upper surfaces thereof and is provided with a pulley 88 operatively connected by means of a belt 89 with an associated pulley 90 fixed upon the shaft 91 of an electric motor 92; the latter is also mounted on the beams 36 as illustrated in Figs. 1, 2 and 3.

Suitable means is provided for supplying the cutting blade 52 with water which in co-operation with a conventional abrasive facilitates the cutting action of said blade in the well-known way. In the illustrated example the segmental sections 49 of the guiding member 46 are accordingly provided with channels 93 extending lengthwise thereof and communicating at their lower ends with branch channels 94 leading to the transverse slot 48 in contiguous relation to the cutting periphery of the blade 52. At their upper ends the channels 93 are connected in any conventional manner with preferably flexible tubes 95 which in turn are connected with a suitable source of water and for convenience pass over pulleys 96 journalled in bearing brackets 97 mounted upon and depending from the forward beam 36, as shown in Fig. 1.

In describing the operation of the apparatus shown in Figs. 1, 2 and 3, it will be assumed that the apparatus is being used for the purpose of cutting stone in a quarry. In such case a plurality of holes A are drilled to predetermined depths and at predetermined distances apart in the stone B which is to be cut as illustrated in Fig. 1.

In practice, at the beginning of a cutting operation, the sleeves or members 60 are rotated in the bearing blocks 58 by actuating one of the shafts 75 to thereby operate the worm gearings 68 and 69 of each sleeve 60 so as to rotate both sleeves 60 in unison. As the sleeves 60 are rotatively actuated, the rods 64 will be held against rotation by the forks 66 in co-operation with the blade 52, with the result that the relative rotation of said sleeves 60 will raise the rods 64 in the sleeves 60 to correspondingly lift the cutting blade 52 and the carrying or guiding member 46; these operations are continued until the blade reaches its uppermost position after which, or at any time previous thereto, the operating shaft 43 is actuated to operate the bevel pinions 42 to thereby rotate the associated bevel pinions 41 and correspondingly rotate the adjusting screws 39 relatively to the nuts 38. The actuation of the adjusting screws 39 is in a direction to slidably raise the slides 37 and beams 36 on the vertical guide members 31 to the uppermost position thereon and to correspondingly elevate the cutting blade 52. The movable support on which the various instrumentalities are mounted is then shifted on the tracks 25 by rotating the shaft 28 and worm gearings 26, 27 until the cutting blade 52 is in registry with the point at which a cut is to be made and with the carrying and guiding member 46 in axial alignment with one of the previously drilled holes A. The depending end of the carrying and guiding member 46 is then inserted into said hole A until the cutting edge of the blade 52 rests upon the top surface of the stone B as illustrated in Fig. 11. The motor 92 is then started to thereby rotate the shaft 85 and crank 84 which through the medium of the link 82 and arm 80 rocks the lever 54 on the pivot 55. The rocking movement of the lever 57 is transmitted by means of the sleeves 60 and rods 64 to the blade 52 which is correspondingly oscillated on the pivot pin 50. Coincidentally with this oscillation of the cutting blade water is supplied thereto through the tubes 95, channels 93, and branch channels 94. As the cutting action of the blade 52 proceeds, the shaft 43 is periodically actuated to operate the adjusting screws 39 in a direction to lower the beam 36 on the vertical guiding members 31 which operation is repeated until the beams 36 have reached their lowest position on said vertical guide members 31. At this stage the motor 92 is preferably stopped to arrest the oscillation of the blade 52 and the shaft 43 is operated to actuate the adjusting screws 39 in a direction to return the beams 36 to their uppermost position on the vertical guide members 31 and to correspondingly raise the blade 52 and its associated elements; these operations elevate the blade 52 in the cut previously made thereby and at the same time raise the carrying and guiding member 46 in the hole A in which it is located. To restore the blade 52 into cutting engagement with the stone at the bottom of the cut previously made, one of the shafts 75 is operated to actuate the worm gears 68, 69, and to thereby rotate the sleeves 60 relatively to the rods 64 in a direction to move said rods 64 out of said sleeves 60, this operation being continued until the cutting periphery of the blade 52 engages the stone at the bottom of the aforesaid previous cut. The motor 92 is then again started to again operate the crank 84 and to rock the lever 54 and thereby oscillate the blade 52 to effect a continuation of the previously made cut. When the periodic adjustments of the beams 36 downwardly on the vertical guide members 31 has again brought said beams 36 to the lowermost position on the vertical guide members 31, the motor 92 is again stopped to arrest the oscillation of the blade 52 after which the beams 36 are returned to their highest position and the cutting blade is again adjusted into contact with the stone at the bottom of the cut as previously described, whereupon the oscillation or rocking of the blade 52 is renewed to continue the cutting action thereof. These operations are repeated until the maximum cut possible or desired has been effected, whereupon the parts are restored to normal position and the movable support is shifted to bring the carrying and guide member 46 into registry with a subsequent hole A into which said member 46 is inserted to bring the cutting periphery of the blade 52 into contact with the top of the stone B at a new location to start a new cut and a new cycle of operations such as hereinbefore described.

The form shown in Figs. 9 and 10 includes a guiding member 46a having a solid lower end 47a from which two upright solid sections 49a of segmental form in cross-section project upwardly in spaced relation to each other to form a slot 48a corresponding to the slot 48 of the form first described. The opposed faces of the upright sections 49a are provided with guide grooves 51a extending lengthwise thereof from the solid end 47a to the upper end of the guiding member 46, as shown in Fig. 9. Carrying members 51b are slidably mounted in the guide grooves 51a and project toward each other in opposed spaced relation in a manner corresponding to the lugs 51 of Fig. 4. A pivot pin 50a is mounted in the members 51b and bridges the space therebetween to provide a pivotal support on which the blade 52a is pivotally mounted, said blade projecting downwardly in and in opposite directions through the slot 48a in a manner similar to that of the form first described. Otherwise this form of the invention may be the same in construction as the form shown in Figs. 1, 2 and 3.

In utilizing the form of the invention now being described the guiding member 46a is inserted into one of the previously drilled holes A at the point where the cut is to be commenced, it being understood that generally speaking the member 46a corresponds in axial length to the depth of said drilled holes A. The cutting blade 52a is oscillated as in the previous form and as the parts are adjusted in the manner hereinbefore set forth the members 51b are shifted downwardly in the guide grooves 51a to progressively advance the cutting blade 52a as the cutting action thereof proceeds. In all other respects the operation of this form of the apparatus may be the same as previously set forth herein.

In addition to serving as an apparatus for cutting stone in the manner set forth herein, the novel apparatus may be used for producing cuts in stone or other material located in positions which are more or less inaccessible to cutting apparatus of existing types. In Fig. 12 we have illustrated an example of such additional use and have shown a dam $a$ of conventional type which rests upon a more or less pervious layer $b$ of shale or the like, said layer of shale $b$ in turn resting upon a strata of bedrock $c$. Because of the pervious character of the layer $b$ of shale or the like, the water $d$ impounded by the dam $a$ seeps through said pervious layer $b$ and beneath the dam $a$ resulting in a considerable and undesirable leakage and loss of water. To overcome this leakage, it has been proposed to build a protecting barrier in proximity to the dam and extending downwardly through the pervious layer $b$ and into the bedrock $c$. Because of the inaccessiblity of the layer $b$ and bedrock $c$ the operation of sinking the aforesaid barrier into the bedrock $c$ in the manner required to effect the desired results. With the present novel apparatus the existing difficulties are avoided and the operation of sinking the barrier through the layer $b$ and into the bedrock is simplified to a maximum degree. As shown in Fig. 14, the aforesaid protecting barrier may consist of metallic or other plates $e$ hinged together at $f$ to form an articulated member which in practice extends downwardly through the previous layer $b$ and into the bedrock $c$ and projects upwardly therefrom in surface parallelism with the face $g$ of the dam $a$ as will appear more fully hereinafter. Such barrier to be effective for its intended purpose must extend through the pervious layer $b$ and to a predetermined height above the same in the impounded water $d$; the barrier $e$ is also required to extend into the bedrock $c$ a sufficient distance to provide an effective seal against the aforesaid leakage and also in order to efficiently maintain said barrier in position. The arrangement is such that when the barrier is in place it will act to prevent the previously mentioned seepage of water through the pervious layer $b$ or to materially reduce such leakage. The novel apparatus hereinbefore described provides an efficient medium for cutting through the pervious layer $b$ and into the bedrock $c$ to provide a cut into which the articulated barrier $e$ may be sunk into the bedrock $c$ and in which said barrier may be positively positioned and anchored to serve its intended purpose.

In utilizing the apparatus for the indicated operations, a temporary platform $h$ is mounted on the dam $a$ so as to project outwardly from the face $g$ thereof, for instance, at a predetermined distance above the level of the water $d$ and is temporarily fixed in this location in any convenient manner. The tracks 25 are mounted on this platform $h$ to define a path for the cutting apparatus, the movable support of which is mounted on said tracks 25, for instance, as shown in Fig. 12, with the sleeves or members 60 and the rods 64 depending in off-set relation to said platform $h$. At an appropriate time a series of holes A' corresponding to the holes A of Fig. 1 are drilled through the pervious layer $b$ and into the bedrock $c$ and are spaced apart to an extent corresponding to the distance between adjacent articulated joints $f$ of the barrier $e$, said holes A' being of a diameter sufficiently large to receive said articulated joints $f$ when the barrier $e$ is set in place. The apparatus is adjusted on the tracks 25 to position the carrying and guiding member 46 in registry with one of said holes A', said carrying and guiding member 46 being inserted into said holes A' to bring the cutting blade 52 into position to effect the first cut. After the cutting blade 52 has been adjusted into contact with the surface of the layer $b$, the apparatus is operated and periodically adjusted in the manner previously described herein to cause the cutting blade to cut through the layer $b$ and into the bed rock $c$ in the same way as described with respect to the stone B of Fig. 1. The cutting operations are repeated until the layer $b$ and the bedrock $c$ have been cut to provide a recess corresponding in length at least to the width of the dam $a$ and interrupted at intervals by the enlargements resulting from the previously drilled holes A'. After the final cut through the layer $b$ and into the bedrock $c$ has been completed, the apparatus and the platform $h$ may be removed to permit the articulated barrier to be inserted into the continuous cut with the articulated joints $f$ fitting into the enlarged portions thereof and the plates $e$ extending into the cuts made by the cutting blade 52. Any suitable method may be employed if necessary, for anchoring the articulated barrier $e$ in place in the bedrock and to further improve its sealing action. If it is desired to make the cuts in very close proximity to the face $g$ of the dam $a$, the apparatus may be placed on the tracks 25 in the reverse position from that illustrated in Fig. 12 and with the sleeves or members 60 and the rods 64 extending downwardly through the platform $h$ in contiguous relation to the face $g$ of the dam $a$. It is also possible by placing the lever 54 upon the face of the inner channel member 36 and by positioning the associated mechanisms and elements accordingly, and by setting the apparatus upon the tracks 25 as shown in Fig. 12, or in a reverse position, to provide for cutting through the layer $b$ and into the bedrock $c$ at varying distances from the face $g$ of the dam $a$. The articulated barrier $e$ may accordingly be set in a plurality of positions relatively to the face $g$ of the dam $a$ to secure the most efficient results. In any case the articulated barrier by extending into the bedrock $c$ and through the pervious layer $b$ will prevent the water $d$ from seeping through said layer $b$ either entirely or to a greatly reduced extent as will be apparent.

In the form shown in Fig. 15, the forked members 66 of the rods 64 are pivotally connected at 67 with the cutting blade 52 at points thereof which, in the operation of the apparatus, register with holes $A^2$ upon opposite sides of the hole $A^2$ in which the carrying and guiding member 46 is located, as illustrated in Fig. 15. The cutting blade 52 in this form is accordingly of larger diameter than the cutting blade 52 of the form first described. The blade 52 is oscillated and adjusted in the same way as previously described, the apparatus of which it forms a part being constructed in the same way as shown in Fig. 1 with the exception that the lever 54 and its associated elements are arranged to meet the changed conditions incidental to the different points of connection of the forked member 66 with the blade 52. In practice, this form of the apparatus operates in the same way as hereinbefore described with the forked members 66 and the rods 64 operating within the holes $A^2$ as the oscillation of the blade 52 takes place. The construction of the apparatus and its operation particularly with respect to the periodic adjustment of the blade 52 as the cutting advances and for resetting said blade to its normal position may be the same as described with respect to the apparatus illustrated in Fig. 1.

In all of its forms, the cutting aparatus operates with a maximum of efficiency to produce cuts in stone and other material with a minimum of waste and with a cutting direction uniformly maintained regardless of the hardness of the stone or other material being cut. The apparatus in all of its forms is particularly adapted for cutting stone and other materials which are more or less inaccessible to ordinary and existing types of cutting devices.

Various changes in the specific forms shown and described may be made within the scope of the claims without departing from the spirit of the invention.

We claim:

1. In a cutting apparatus for material previously drilled to form a hole therein, a carrying member arranged to slidably fit said hole, a curvilinear cutting blade pivotally mounted on said member, a movable support including vertical guide members located in spaced parallel relation, slides movable lengthwise of said guide members, channel members carried by said slides upon opposite sides of said guide members, a rocking lever pivotally mounted upon a face of one of said channel members and provided with forks at its opposite ends, bearing blocks pivotally mounted in said forks, cylindrical sleeves rotatably mounted in said bearing blocks and having internally threaded portions, threaded rods extending into said sleeves in threaded engagement with the threaded portions thereof and pivotally connected with said cutting blade, an arm projecting from said rocking lever in transverse relation thereto, a link having one end pivotally connected with said arm, a crank pivotally connected with the other end of said link, a shaft journalled on said channel members and carrying said crank, a motor mounted on said channel members and operatively connected with shaft whereby said lever is rocked to oscillate said cutting blade on its pivotal connection with said carrying member, means for adjusting said slides and channel members on said guide members for progressively advancing said cutting blade and concurrently shifting said carrying member in said hole, and means for rotating said sleeves in said bearing blocks relatively to said rods to shift said cutting blade relatively to said sleeves.

2. In a cutting apparatus for material previously drilled to form a hole therein, a carrying member arranged to slidably fit said hole, a curvilinear cutting blade pivotally mounted on said member, a movable support including vertical guide members located in spaced parallel relation, slides movable lengthwise of said guide members, channel members carried by said slides upon opposite sides of said guide members, a rocking lever pivotally mounted upon a face of one of said channel members, telescopic members pivotally connected with said rocking lever and with said cutting blade, operating means on said channel member for rocking said lever to oscillate said cutting blade on its pivotal connection with said carrying member, means for progressively advancing said cutting blade and concurrently shifting said carrying member into said hole, and means for adjusting said telescopic members telescopically to shift said cutting blade independently of said progressively advancing means.

3. In a cutting apparatus for material provided with a drilled hole, a guide member arranged to fit into said hole, carrying means slidable lengthwise of said guide member, a pivot pin carried by said carrying means to provide a center of oscillation, a curvilinear cutting blade pivotally mounted on said pivot pin and arranged to be oscillated thereon, said cutting blade being progressively advanced as the cutting proceeds and said carrying means being concurrently shifted on said guide member to maintain the cutting direction of said blade.

4. In a cutting apparatus for material provided with a plurality of drilled holes in spaced parallel relation with each other, a member arranged to extend into a selected one of said holes, a curvilinear cutting blade pivotally mounted on said member, a mobile support, operating means on said support, and extensible connections from said operating means to said cutting blade, said connections being located to register with holes upon opposite sides of said selected hole and to extend into said holes as the cutting operation proceeds.

5. In a cutting apparatus of the kind described, a mobile support including an upright guide frame, adjustable carrying means slidably mounted on said guide frame, operating means located on said carrying means and including a rocking member, a supporting member, a curvilinear cutting blade pivotally mounted on said supporting member, extensible members connecting said rocking member with said cutting blade whereby the latter is oscillated on its pivotal connection with said supporting member at a distance from said rocking member, adjusting means for shifting said carrying means on said guide frame to advance said cutting blade as the cutting proceeds, and means for adjusting said extensible members to shift said cutting blade independently of said adjusting means.

6. In a cutting apparatus, supporting means comprising a member consisting of a cylindrical solid end section and upright segmental sections extending upwardly from said solid end section and spaced apart to provide a transverse slot extending diametrically across said member, lugs on said upright sections having opposed ends in spaced relation to each other, a pivot pin extending transversely across the space between said lugs, a curvilinear cutting blade pivotally mounted on said pivot pin for oscillation in and through said transverse slot, operating means located at a distance from said blade for oscillating it on said pivot pin, said upright segmental sections being provided with longitudinal and transverse channels leading to said transverse slot in proximity to the cutting edge of said cutting blade, and means for connecting said channels with a source of water supply.

7. In a cutting apparatus of the kind described, a support, operating means on said support including a rocking member provided with forked ends, bearing blocks pivotally mounted in said forked ends, cylindrical sleeves rotatably mounted in said bearing blocks and provided with internally threaded sections, screwthreaded rods extending into said sleeves in threaded engagement with said internally threaded sections and projecting outwardly beyond said sleeves, heads on the inner ends of said rods slidably fitted in said sleeves, forks at the outer ends of said rods, a curvilinear cutting blade extending into said last-named forks and pivotally connected therewith, a supporting member on which said cutting blade is pivotally mounted for oscillation by said rocking member through said sleeves and rods, and means for concurrently rotating said sleeves in said bearing blocks relatively to said rods to shift said cutting blade toward and away from said rocking member.

8. In a cutting apparatus of the kind described, a support, operating means on said support including a rocking member provided with forked ends, bearing blocks pivotally mounted in said forked ends, cylindrical sleeves rotatably mounted in said bearing blocks and provided with internally threaded sections, screwthreaded rods extending into said sleeves in threaded engagement with said internally threaded sections and projecting outwardly beyond said sleeves, heads on the inner ends of said rods slidably fitted in said sleeves, forks at the outer ends of said rods, a curvilinear cutting blade extending into said last-named forks and pivotally connected therewith, a supporting member on which said cutting blade is pivotally mounted for oscillation by said rocking member through said sleeves and rods, worm gears fixed on said sleeves, bearing brackets carried by said bearing blocks, shafts journalled in said bearing brackets, worm pinions on said shafts in mesh with said worm gears, sprocket wheels on said shafts, and a sprocket chain connecting said sprocket wheels whereby said sleeves are concurrently rotated in said bearing blocks relatively to said rods to shift said cutting blade toward and away from said rocking member.

9. The combination of a relatively high upright structure projecting upwardly from base material provided with a drilled hole, a platform extending from an upright face of said structure near the top thereof, a mobile support movably mounted on said platform, operating means carried by said support, operating members connected with and depending from said operating means, a curvilinear cutting blade connected with said operating members and positioned in cutting contact with the base material on which said structure is erected, a carrying member arranged to extend into said drilled hole and on which said blade is pivotally mounted for oscillation by said operating members and operating means to cut into said base material, and means for advancing said cutting blade and for concurrently shifting said carrying member in said drilled hole as the cutting proceeds.

10. In a cutting apparatus for material provided with drilled holes in the intended cutting plane, a member arranged to extend into a selected one of said holes, a curvilinear cutting blade pivotally mounted on said member, and operating means including extensible connections to said cutting blade for oscillating said cutting blade and for advancing said member in the selected hole with said cutting blade as the cutting operation proceeds.

11. In a cutting apparatus for material provided with drilled holes in the intended cutting plane, a member arranged to extend substantially full-way into a selected one of said holes, adjustable carrying means slidably mounted on said member, a curvilinear cutting blade pivotally mounted on said carrying means, and operating means including extensible connections to said cutting blade for oscillating said cutting blade and for advancing said carrying means with said cutting blade along said member as the cutting operation proceeds.

JULIUS WEGNER.
ALFRED WEGNER.